Feb. 11, 1958 — D. D. GLOWER ET AL — 2,822,824
FLUID VALVE
Filed June 22, 1954
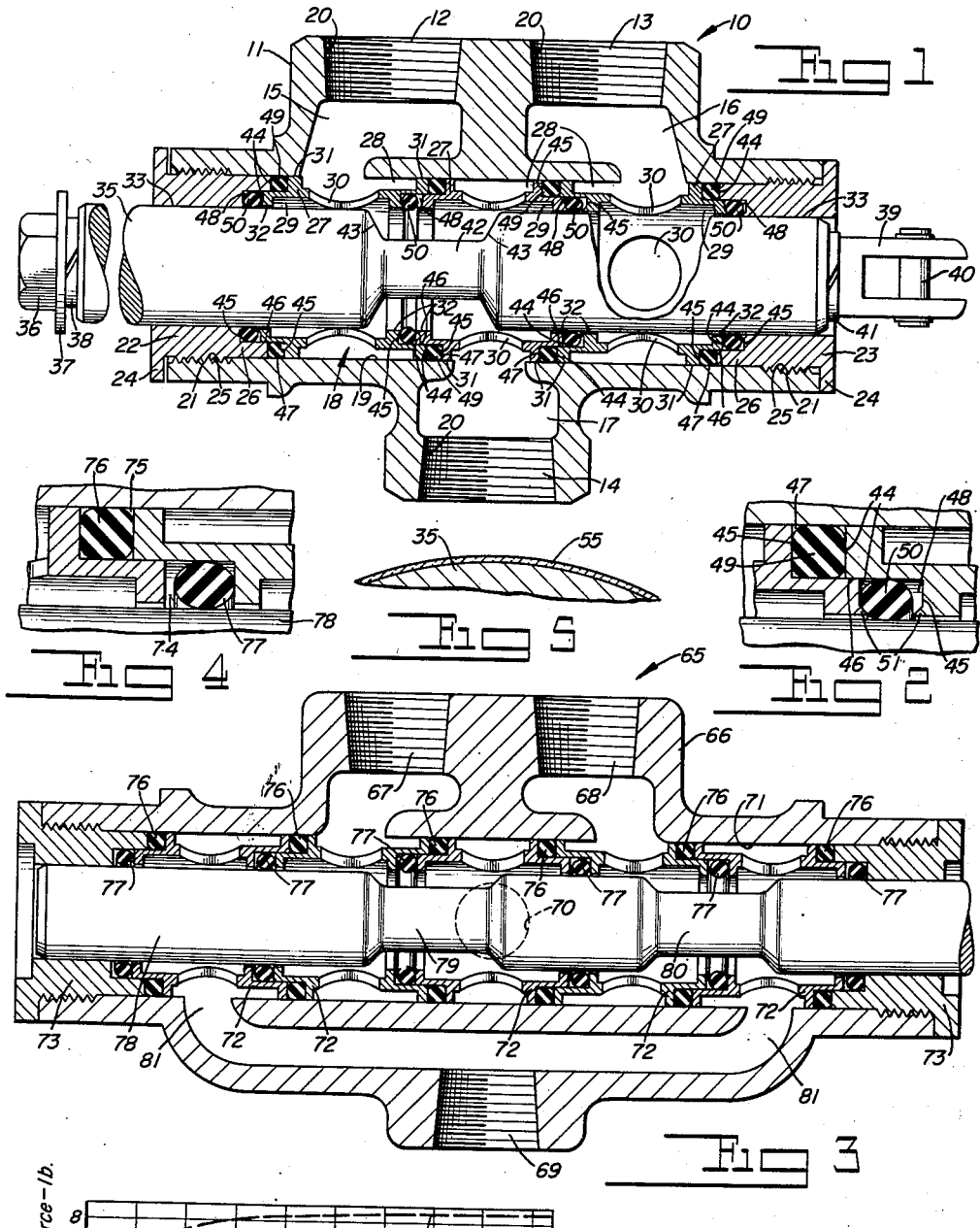
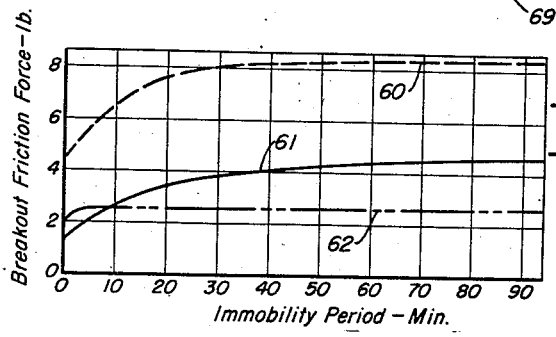
INVENTORS
Albert M. Rockwood
Donald D. Glower
BY
ATTORNEYS.

United States Patent Office 2,822,824
Patented Feb. 11, 1958

2,822,824

FLUID VALVE

Donald D. Glower and Albert M. Rockwood, Columbus, Ohio, assignors, by mesne assignments, to Valvair Corporation, Akron, Ohio, a corporation of Ohio Application June 22, 1954, Serial No. 438,530

4 Claims. (Cl. 137—625.42)

This invention relates to fluid valves. More particularly, it relates to improvements in that type of fluid valve commonly known as a "selector valve" which employs a reciprocable plunger for diverting fluid from one selected valve passage to another.

Briefly, the valve and improvements of this invention comprise: a housing having a longitudinal bore therethrough; and a plurality of ports communicating through chambers to the valve bore; a plurality of annular spacers positioned within the bore and retained therein by suitable retainers at each end of the bore; a stem that is positioned within the inner cylindrical surface of the spacers and retainers, and is adapted to slide therein, having a necked portion of reduced diameter intermediate its ends; the spacers and retainers being adapted to telescope within adjacent members providing an outer annular groove containing a compression seal and an inner annular groove containing a resilient seal at each position where adjacent spacers or retainers meet. Each spacer is apertured between its ends to provide for fluid passage from the outer side to the inner side of the spacer. At least one spacer is provided for each valve port. The surface of the valve stem preferably is coated with a layer of glass or porcelain enamel.

Fluid-flow through this valve is controlled by the position of the necked portion in the valve stem. This necked portion may be positioned so as to selectively open or close the various ports one from another by allowing fluid passage between adjacent spacers through the necked portion of the stem.

Valves of this particular type have been characterized by sealing difficulties in the past. It is apparent that, in order for a valve of this type to function properly, an effective seal must be maintained between the housing bore and the stem at each retainer and between adjacent spacers. Past efforts to provide effective sealing have tended to introduce the additional problems of increased "break-out" friction and decreased seal life.

The term "break-out" friction, as used herein, is the force required to initiate motion of the stem of the valve after it has remained in one position a period of time. In valves of this kind, break-out friction force is usually about twice that of running friction force. When a valve of this type operates with high break-out friction forces, not only is it inconvenient to operate, but the life of the seals is greatly reduced.

Valves of this type are often used in the control of corrosive fluids. For this reason, it is the conventional practice to manufacture a large number of these valves out of noncorrosive metals. Since these materials are relatively expensive, it is an important advantage in the manufacture of these valves to provide a valve of compact construction.

Accordingly, it is an object of this invention to provide a plunger-type valve which will effectively seal selected fluid passageways one from the other when used to control a gas or a liquid. It is a further object to provide a plunger-type valve that is compact in construction, uses a minimum of material, and may be manufactured at low cost. It is still a further object of this invention to provide a plunger-type valve that operates with greatly reduced break-out friction forces. Yet another object is to provide a plunger-type valve in which the contact area between the inner seals and the stem is reduced, thus providing minimum break-out friction forces.

It is a purpose of this invention to provide a plunger-type valve having separate seals between the spacers and the valve bore, and between the spacers and stem, thus reducing break-out friction forces.

Still another purpose is to provide a plunger-type valve wherein such separate seals are used, but wherein the size of the valve is not increased. Another purpose of this invention is to provide an improvement in plunger-type valves, wherein the spacers and retainers telescope at adjacent ends.

Yet another object is to provide such a plunger-type valve wherein the outer seals are compressed by pressure from adjacent spacers, and wherein the inner seals are resilient O-ring type seals. A further object of this invention is to provide an improvement in plunger-type valves wherein the outer seal is a positively controlled pressure seal against the valve bore, which need not be a highly finished surface.

A further purpose of this invention is to provide an improvement in valves, wherein the valve stem is coated with porcelain enamel or glass to reduce break-out friction forces.

To these and other ends, this invention comprises apparatus a preferred form of which is disclosed in the following description and attached drawings.

In the drawings:

Fig. 1 is a sectional elevation view of a three-way plunger-type selector valve according to the invention;

Fig. 2 is an enlarged partial sectional elevation view of the spacer and seal construction of the valve of this invention;

Fig. 3 is a sectional elevation view of a four-way plunger-type selector valve according to this invention;

Fig. 4 is a partial sectional elevation view of an alternate spacer and seal construction of a valve of this invention;

Fig. 5 is a partial cross-sectional view of a portion of a stem according to the invention, and Fig. 6 is a graph showing break-out friction force as a function of immobility time of a conventional plunger-type selector valve and of valves of this invention.

Referring to Fig. 1, a valve, designated generally as 10, comprises a housing 11, having ports 12, 13, and 14, which communicate with chambers 15, 16, and 17, respectively. The housing 11 has a longitudinal bore designated generally as 18, having a bore surface 19. The ports 12, 13, and 14 may be provided with threads 20—20 for connection to a fluid system, not shown. The bore 18 is provided with internal threads 21—21 at each end to receive end retainers 22 and 23. Each of the end retainers 22 and 23 comprises a shoulder portion 24, a threaded portion 25, and a sleeve portion 26. The sleeve portion 26 is adapted to enter the bore 18 by a sliding fit on the bore surface 19. Each of the end retainers 22 and 23 has an inner diameter surface 33.

A series of spacers 27—27, generally annular in shape, are longitudinally disposed within the bore 18. Each spacer 27 is provided with an outer annular chamber 28 and an inner annular chamber 29 with suitable apertures 30—30 therebetween. Each spacer 27 is provided with major diameter portions 31—31 at each end, and minor diameter portions 32—32 at each end.

A stem 35 is disposed within the spacers 27—27 and the retainers 22 and 23, and is adapted to slide transversely by close sliding fit in the minor diameter portions 32—32 of the spacers and the inner diameter surfaces 33—33 of the end retainers 22 and 23. Attachment means for external operating devices, not shown, such as a stud 36, washer 37, and lock washer 38 or clevis 39 with pin 40 and lock washer 41, may be provided at at least one end of the stem 35. Intermediate the ends of the stem 35 is a necked portion 42 of reduced diameter between transition portions 43—43.

Spacers 27—27 and end retainers 22 and 23 are provided with longitudinally protruding flanges 44—44 and longitudinally recessed flanges 45—45 connected by annular surfaces 46—46 at engaging ends. The annular surfaces 46—46 of adjacent spacers 27—27 or end retainers 22 and 23 are adapted to telescope, as shown in Fig. 2. The telescopic engagement of adjacent spacers 27—27 and end retainers 22 and 23 provides annular outer grooves 47—47 at the ends of each spacer 27. This telescopic assembly also provides annular inner grooves 48—48 at the ends of each spacer 27. Ring-type seals 49—49 are disposed in each of outer grooves 47—47. Resilient O-ring seals 50—50 are disposed in all of the inner grooves 48—48.

The valve 10 operates in the following manner: The three-way valve, as shown in Fig. 1, may be set to allow the passage of fluid between ports 12 and 14 and, at the same time, allow no fluid to pass through port 13. The valve shown in Fig. 1 is in the above-described position. Fluid passes in port 12, through chamber 15 into chamber 28, through aperture 30 into chamber 29, around the necked portion 42, out aperture 30 into chamber 17, and out through port 14. Of course, the direction of flow may be reversed. Fluid present in port 13 and chamber 16 is prevented from flowing by the stem 35. Seals 49—49 and 50—50 prevent cross-flow between the moving fluid and the stationary fluid, and prevent fluid from escaping from the valve 10 past retainers 22 and 23.

When it is desired to change the flow from ports 12 and 14 to ports 13 and 14, the stem 35 is moved to the right a distance sufficient to establish the necked portion 42 in a corresponding position to the right of the center of port 14. In the same manner as just described for flow through ports 12 and 14, flow takes place through ports 13 and 14, and flow through port 12 is blocked.

During the operation of the valve, the seals 49—49 do not move. A static compression seal is provided at the contact position between the bore surface 19 and the seals 49—49, and at all three sides of the outer grooves 47—47 by longitudinal compression between spacers 27—27, which is produced by the threaded inward movement of end retainers 22 and 23. It will be noted that the amount of compression which is exerted to provide this seal is variable, and may be controlled by the amount of this inward threaded movement. The telescopic assembly of adjacent spacers 27—27 and end retainers 22 and 23 makes this controlled pressure seal possible. Because a controlled pressure seal is provided at the bore surface 19, the surface 19 need not be a highly finished surface. The cost of manufacturing a valve of this type is reduced by the elimination of finishing operations on the bore surface 19.

Some valves of the plunger type use a single seal of sufficient size to completely fill the space between the valve bore surface and the stem surface. Spacers and end retainers having radial end surfaces are spaced between the seals. A typical valve of this construction is shown in U. S. Patent 2,661,182. In a valve of the type therein shown, break-out friction forces have been found to be relatively high in comparison with those of the valve 10 of this invention. In valves having a single seal between the bore and the stem, the seal is adapted to provide a double function. One function is to provide a static seal at the bore and the other function is to provide a dynamic seal at the stem, when the stem moves back and forth. In order to accomplish an effective seal at the bore, there must be sufficient compression on each seal to confine the seal against the stem. This compression produces break-out friction forces that are usually relatively high and troublesome.

It has been found that break-out friction is a function of the amount of pressure between the surface of the seal and the surface of the stem. It has also been found that the amount of break-out friction is affected by the amount of contact area between the seal and the stem.

The telescopic engagement relationship between adjacent spacers 27—27 and end retainers 22 and 23 in the valve of this invention provides many advantages, to the end that break-out friction forces are substantially reduced. By the provision of separate outer seals 49—49 and inner seals 50—50, and isolating these seals one from the other, smaller inner seals 50—50 may be used, and they may be of a size only large enough to provide an effective dynamic seal against the stem 35. Thus the amount of pressure between the surface of the seals 50—50 and the stem 35 is a minimum. In addition, the area of contact between the seals 50—50 and the stem 35 may be a minimum because the cross-sectional diameter of the seals 50—50 may be reduced to a minimum.

Further, through the use of this telescoping engagement, the distance between the bore surface 19 and the stem 35 need not be increased, even though separate seals are provided. The housing 11 may be as compact as a single-seal valve.

As seen in Fig. 2, a lip 51 is provided consisting of a protrusion on the recessed flange 45 of each spacer 27. A similar lip 52 is provided at the inner edge of the protruding flange 44 of an adjacent spacer 27. These lips 51 and 52 retain the seals 50—50 when the seals 50—50 are not in engagement with the stem. It has been found that seals 50—50 having smaller cross-sectional area may be used if means is provided to retain the seals 50—50 in the inner grooves 48—48 when the necked portion 42 of the stem 35 is in alignment with these seals 50—50.

In Fig. 1, the necked portion 42 is so disposed with relation to an inner seal 50. This has been found to be a particular advantage in a large valve, such as 1-inch nominal pipe size, wherein this retention means makes it possible to use an O-ring of commercially available size.

The force required to produce motion between a resilient O-ring seal made of rubber, or neoprene, and an object inserted therein is apparently the result of an adherence between the surface of the resilient seal and the surface of the object. Conventional practice in the past has been to use a rubber or neoprene seal on a steel or stainless steel plunger. The amount of this break-out friction force is a function of the time during which the object and the seal remain in stationary contact. As the time interval increases between successive movements of the object, the amount of break-out friction force is increased.

The magnitude of break-out friction forces in valves of this type is related to the type of material in contact at the inner seals 50—50. While the seal and valve construction bear importantly on the magnitude of break-out friction force, the break-out friction force can be further reduced if the material of the surface of the stem 35 is glass or porcelain enamel. A valve of this invention and most valves of the plunger type can be improved by the addition of a porcelain-enamel coating 55 on the outer surface of the stem 35, as shown in Fig. 5. It is believed that, although the reduction of break-out friction force accomplished by the provision of a stem 35 having a porcelain enamel coating 55 is related to surface-finish conditions on the stem, it is also related to some inherent natural property of the coating itself, and that this property operates in relation to the rubber or neoprene seal in such a manner that the adherence between the coated stem 35 and the seals 50—50 is reduced. The fact that the magnitude of break-out friction forces occasioned by the use of a porcelain enamel coating 55 is not completely a function of surface finish has been shown by the fact that uncoated valve stems, having surface finishes comparable to the surface of the porcelain-enamel coating have not demonstrated comparable reductions in break-out friction force. In other words, reduction in break-out friction force occasioned by the use of a porcelain-enamel coating on a valve stem is a feature of the relationship between the materials in contact.

A four-way selector valve, designated generally as 65, is shown in Fig. 3. The valve 65 operates in substantially the same manner as the previously described three-way valve in Fig. 1. The valve comprises a housing 66 having ports 67, 68, 69, and 70 connected through chambers to a longitudinal bore 71 in the housing 66. Longitudinally disposed, generally annular shaped spacers 72—72 and end retainers 73—73 are disposed in telescopic end-to-end engagement within the bore 71. The telescopic engagement of adjacent spacers 72—72 and end retainers 73—73 provides inner grooves 74—74 and outer grooves 75—75, as shown in Fig. 4. A stem 78 having two necked portions 79 and 80 of reduced diameter is disposed within the spacers 72—72 and the end retainers 73—73, and is adapted for longitudinal movement therein. Ring-type seals 76—76 are compressed in outer grooves 75—75. O-ring elastic seals 77—77 are disposed in inner grooves 74—74 in sealing contact with the stem 78.

It has been found that valves in the smaller sizes, such as a ¼-inch valve, do not require any retention means to prevent commercially available sizes of inner seals 75—75 from being dislocated when the necked portions 79 and 80 are adjacent the seals 75—75 and the seals 75—75 are not internally supported by the stem 78.

The four-way valve 65 operates as follows: When the valve is in the position shown, the fluid enters the valve through port 70, passes around the necked portion 79 and out through port 67. At the same time, fluid enters port 68 passes around necked portion 80 through channel 81 and out port 69. Flow may be reversed in valve 65 by moving the stem 78 to the left to a position in which the necked portion 79 lies between the two spacers 72—72 that correspond to ports 67 and 69. Necked portion 80 will now be positioned between those spacers 72—72 corresponding to ports 70 and 68. Fluid entering ports 70 will then be discharged from port 68, and fluid entering port 67 will then be discharged through port 69.

Typical results of various tests performed on ¼-inch, three-way plunger-type selector valves are graphically shown in Fig. 6. The horizontal axis of this graph is separated into units of time representing stationary time intervals during which the valves remained in one position. The vertical axis of this graph is divided into pounds and represents the force required to initiate motion of the valve stem to another position after having remained stationary a period of time. The fluid in use during the tests was air at a pressure of 215 p. s. i. The curve 60 represents the performance of a typical single-seal spacer, plunger-type selector valve. The curve 61 represents the performance of a valve of this invention having an uncoated stem. The curve 62 represents the performance of a valve of this invention having a stem coated with porcelain enamel.

As shown in Fig. 6, break-out friction in valves of this general type increases rapidly for periods up to about 30 minutes. For periods over 30 minutes, the increase in break-out friction is relatively small, but continues to increase up to and beyond 90 minutes. In comparing curve 60, representing a conventional valve, and curve 61, representing a valve of this invention having an uncoated stem, it will be seen that the conventional valve requires a force of 8 pounds to initiate motion after a stationary interval of 30 minutes, and the valve of this invention requires only a force of 3¾ pounds to initiate motion after an equal time interval. Thus the valve of this invention reduces break-out friction force by approximately 52 percent at a time interval of 30 minutes. Correspondingly, the valve of this invention shows a reduction in break-out friction force of approximately 48 percent at the end of a 90-minute interval. In comparing curve 62, which represents a valve of this invention having a porcelain-enamel coated stem, with curves 60 and 61, it will be seen that after a 30-minute interval the force required to initiate motion of a stem having a porcelain-enamel coating is 2½ pounds, which represents a reduction in friction force over the valve represented by curve 60 of approximately 65 percent and a reduction in force required over the valve represented by curve 61 of approximately 33 percent.

Comparable reductions in break-out friction force have been observed in tests made on valves of other sizes.

The reduction of break-out friction force is important because the size and capacity of mechanical devices, such as solenoids, used to operate valves may be reduced. Another advantage is that seal wear is reduced, which results in longer seal life.

It will be understood, of course, that, while the form of the invention herein shown and described constitutes a preferred embodiment of the invention, it is not intended herein to illustrate all of the possible equivalent forms of ramifications of the invention. It will also be understood that the words used are words of description rather than of limitation, and that various changes, such as changes in shape, relative size, and arrangement of parts, may be substituted without departing from the spirit or scope of the invention herein disclosed.

What is claimed is:

1. A valve comprising, a housing having a bore therethrough and having a plurality of ports in communication with the bore, a plurality of annular spacers coaxially longitudinally disposed in the bore, retainer means for retaining the spacers in position in the bore, a stem reciprocably disposed in the bore and adapted to slide longitudinally in said spacers, said spacers and retainers have telescoping engaging means at adjacent ends thereof to form separate longitudinally contractable outer annular grooves facing the adjacent bore wall and separate annular inner grooves facing the adjacent stem, a compression seal disposed in each of said outer grooves, said compression seals being compressed by the longitudinal contraction of the respective outer grooves, and a resilient seal disposed in said inner grooves.

2. A valve comprising, a housing having a bore therethrough and having a plurality of ports in communication with the bore, a plurality of annular spacers coaxially longitudinally disposed in the bore, retainer means for retaining the spacers in position in the bore, a stem reciprocably disposed in the bore and adapted to slide longitudinally in said spacers, said spacer ends and said retainer means inner ends forming telescopic joints when the spacers and retainers are disposed in longitudinal end-to-end relation, said joints including the longitudinal passage of one annular surface within another to form separate longitudinally contractable outer annular grooves facing the adjacent bore wall and separate annular inner grooves facing the adjacent stem, a compression seal disposed in each of said outer grooves, said compression seals being compressed by the longitudinal contraction of the respective outer grooves, and a resilient seal disposed in said inner groove.

3. A valve comprising, a housing having a bore therethrough and having a plurality of ports in communication with the bore, a plurality of annular spacers coaxially longitudinally disposed in the bore, end retainers disposed in each end of the bore for retaining the spacers in position in the bore, a stem reciprocably disposed in the bore and adapted to slide longitudinally in said spacers, said spacers and retainers being connected in end-to-end relation respectively by telescoping joints at the adjacent respective ends thereof each of said joints forming separate longitudinally contractable outer annular grooves facing the adjacent bore wall and separate annular inner grooves facing the adjacent stem, a ring-type seal disposed in each of said outer grooves in contact with the adjacent bore wall to form a static seal therewith, said ring-type seals being compressed by the longitudinal contraction of the respective outer grooves, and an O-ring seal disposed in each of said inner grooves in contact with the stem to form a dynamic seal therewith.

4. A valve comprising, a housing having a bore therethrough and having a plurality of ports in communication with the bore, a plurality of annular spacers having an outer cylindrical surface and an inner cylindrical surface coaxially longitudinally disposed in the bore, end retainers disposed in each end of the bore for retaining the spacers in position in the bore, a stem reciprocably disposed in the bore and adapted to slide longitudinally in said spacers and having at least one necked-down portion intermediate its ends, said spacers and retainers being connected in end-to-end relation respectively by telescoping joints at the adjacent respective ends thereof each of said joints forming separate longitudinally contractable outer annular grooves at said outer cylindrical surface facing the adjacent bore wall and separate annular inner grooves at said inner cylindrical surface facing the adjacent stem, an annular packing member disposed in each of said outer grooves in contact with the adjacent bore wall to form a static seal therewith, said annular packing members being compressed by the longitudinal contraction of the respective outer grooves, an annular packing member disposed in each of said inner grooves in contact with the stem to form a dynamic seal of reduced frictional characteristics therewith, and a seal retention lip on each side of each of the inner grooves.

References Cited in the file of this patent

UNITED STATES PATENTS

| | | |
|---|---|---|
| 1,704,759 | Miller | Mar. 12, 1928 |
| 2,039,638 | Druge | May 5, 1936 |
| 2,133,708 | Larson | Oct. 18, 1938 |
| 2,291,248 | Myers | July 28, 1942 |
| 2,415,417 | Collins | Feb. 11, 1947 |
| 2,645,450 | Chessman | July 14, 1953 |
| 2,661,182 | Kipp | Dec. 1, 1953 |
| 2,747,611 | Hewitt | May 29, 1956 |